United States Patent [19]

Payne et al.

[11] Patent Number: 5,520,357
[45] Date of Patent: May 28, 1996

[54] FITTING FOR AN AIRCRAFT BULKHEAD

[75] Inventors: David L. Payne; Augusto M. Limcangco, both of Jacksonville, Fla.

[73] Assignee: B/E Aerospace, Inc., Wellington, Fla.

[21] Appl. No.: 180,154

[22] Filed: Jan. 11, 1994

[51] Int. Cl.[6] .............................. B64C 1/18; B61D 45/00
[52] U.S. Cl. ............................ 244/118.1; 244/118.6; 244/131; 410/105; 410/116
[58] Field of Search ........................... 244/131, 119, 244/129.1, 118.6, 118.1; 410/104, 105, 116

[56]         References Cited

U.S. PATENT DOCUMENTS 4,230,432  10/1980  Howell ................................ 410/105 X
4,630,982  12/1986  Fenner ................................ 410/105 X
4,776,533  10/1988  Sheek et al. ........................ 244/118.6
5,222,694   6/1993  Smoot ................................ 244/131 X
5,230,485   7/1993  Vogg et al. ........................ 244/131 X
5,236,153   8/1993  La Conte ........................... 244/118.6

FOREIGN PATENT DOCUMENTS 513926  10/1939  United Kingdom .................. 244/131

Primary Examiner—Andres Kashnikow
Assistant Examiner—Virna Lissi Mojica
Attorney, Agent, or Firm—Kenyon & Kenyon

[57]         ABSTRACT

A fitting for attaching a galley wall or bulkhead to the interior of an aircraft is disclosed. The fitting uses a separable attachment plate and an anchor, to which an anchor bolt can be attached from above the attachment plate.

9 Claims, 3 Drawing Sheets

FITTING FOR AN AIRCRAFT BULKHEAD

BACKGROUND OF THE INVENTION

Aviation is an extremely competitive field, in which strategies for the efficient utilization of space, fuel economy, and ease of aircraft assembly and modification must be optimized with respect to their cost.

Constraints imposed by space, which in turn are driven by the economics of aviation, demand that the space within an aircraft cabin be utilized as efficiently as possible. These constraints also favor those strategies for space utilization that are inexpensive over those that entail greater costs, either in terms of labor, parts, or aircraft down-time.

The efficient placement of aircraft bulkheads and galleys to partition the interior space of an airplane is of great importance, as such partitions are used to delineate the various portions of the cabin space by function. When passenger economics dictates that these partitions be moved about, or when competitive pressures suggest that the relative placement or sizes of these compartments be altered, it is important that the hardware affixing the bulkheads to the cabin floor permit the rapid and inexpensive re-positioning of the bulkheads and galley walls.

Unfortunately, the known hardware employed to establish galleys and bulkheads is often cumbersome to install and reposition. There remains a need for a fitting to accommodate the rapid installation and repositioning of aircraft bulkheads and galleys.

SUMMARY OF THE INVENTION

The present invention meets these needs by providing a fitting that can be used on a conventional track without requiring the availability of any free vertical space beyond that required by the bulkhead itself.

In the present invention, the bulkhead or galley wall (in this patent specification, the terms are used interchangeably) is attached to an aircraft floor-mounted track by a series of fittings, each comprising an attachment plate and a hardened bolt. The bolt serves to link the galley to the floor through the attachment plate, a track affixed to the floor, and a threaded anchor nut located within the track. The bolt can be inserted through the attachment plate into the anchor nut from above after the bulkhead has been set in place on the track and attachment plate, thereby avoiding the need to raise the bulkhead when connecting it to the fitting.

DETAILED DESCRIPTION

Figure 1:
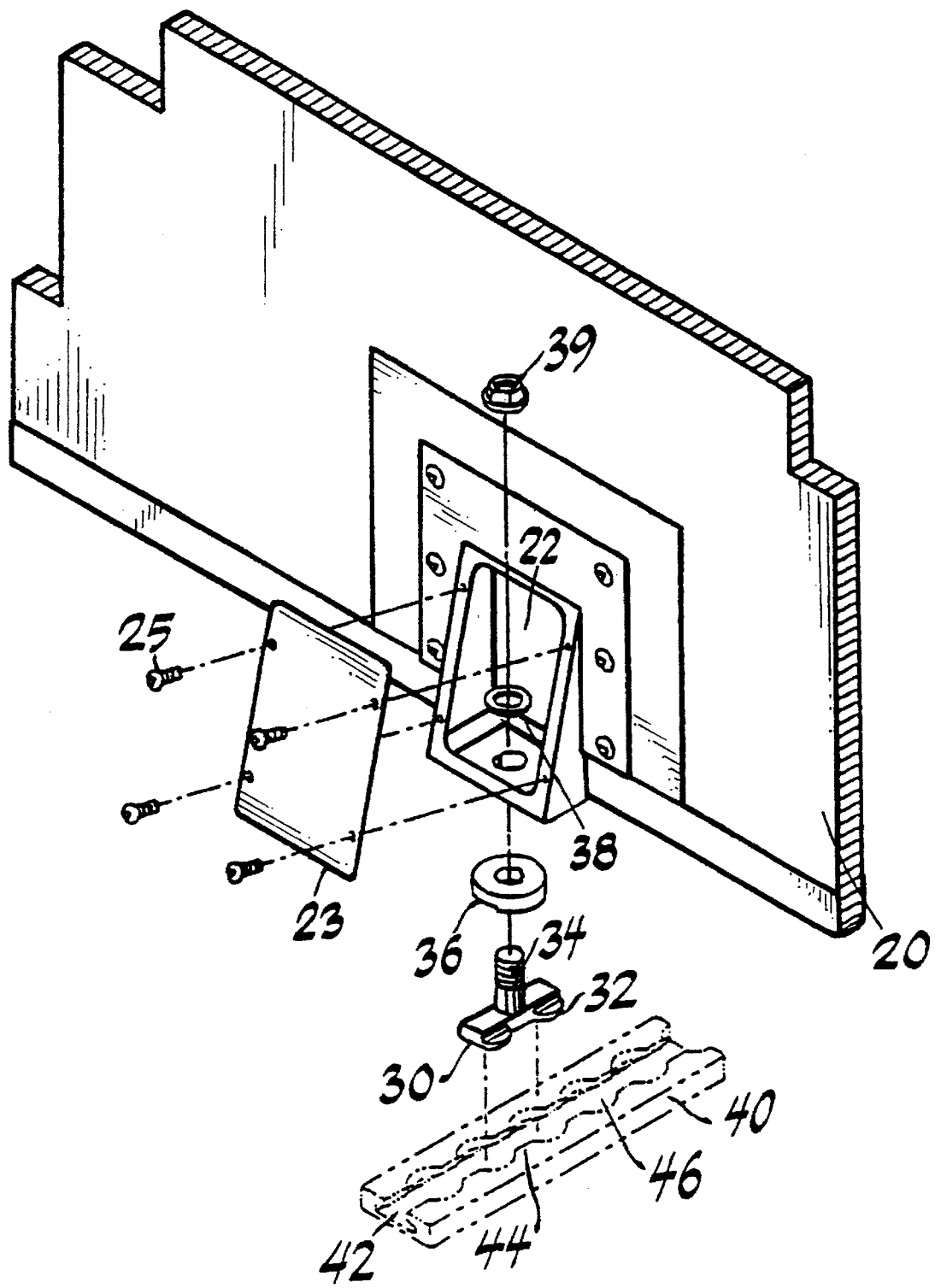
FIG. 1 is an exploded perspective view of a prior art fitting.

FIG. 1 is an exploded view of a prior art bulkhead fitting. A track 40 is first fastened down onto a floor. The track 40 includes a series of tabs 44 separating a series of circular zones 46 arrayed along the track in one inch intervals. A stud fitting 30 having a pair of feet 32 and an upwardly directed link 34 is fitted into the track, as the feet 32 have a generally circular shape that can be accommodated by the circular zones 46, thus permitting the feet to rest within the track 42. By then moving the stud fitting 30 along the track 42 so that the feet underlie the tabs 44 instead of the circular zones 46, the stud fitting is no longer free to leave the track.

The link 34 is an integral part of the stud fitting 30. In order to use this fitting to secure a bulkhead, the following installation sequence must be followed. First, a washer 36 is first placed over the link 34. The bulkhead 20 must then be physically raised over the link 34 a height sufficient to clear the link, and is then lowered over the link until it contacts the fitting. A washer 38 and a nut 39 are then threaded onto the link 40 so as to secure the bulkhead attachment box 22 of the bulkhead 20 to the track 40. The bulkhead attachment box 22 is then closed off with a cover plate 23, which is affixed to it with the aid of screws 25.

This prior art device has the disadvantage that it requires more vertical space than is actually required by the bulkhead itself, because the installation procedure necessarily requires that the bulkhead be raised a height sufficient to clear the link 34. Consequently, the lack of space has sometimes led those using this prior art device to use bulkheads that are provided in the form of split upper and lower halves. Also, washer 36 sometimes slides out of position during this procedure, thus requiring one to start over. The instant invention, illustrated in the remaining figures, avoids these problems.

Figure 2:
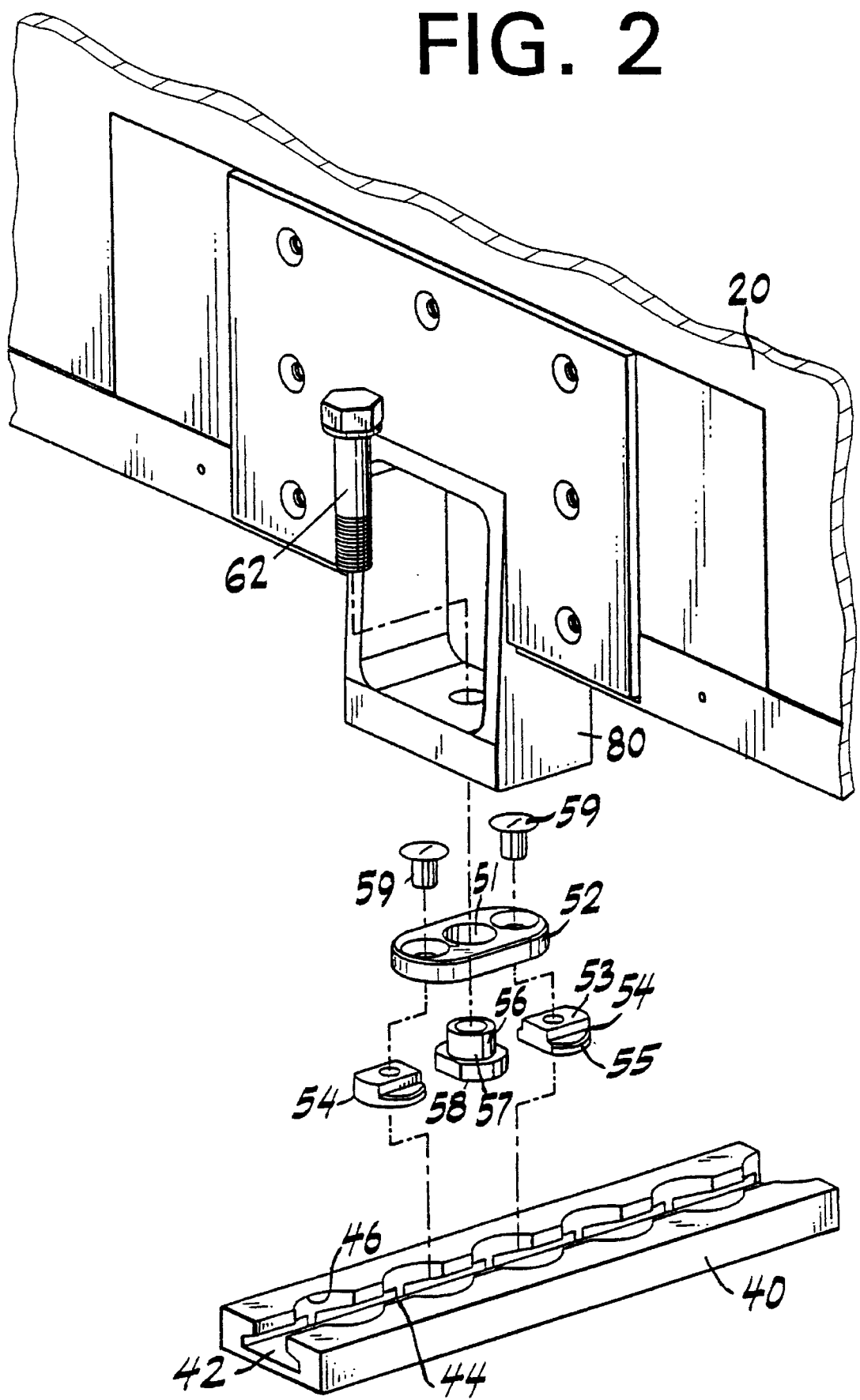
FIG. 2 is an exploded perspective view of a fitting constructed according to the principles of the invention.
Figure 4A:
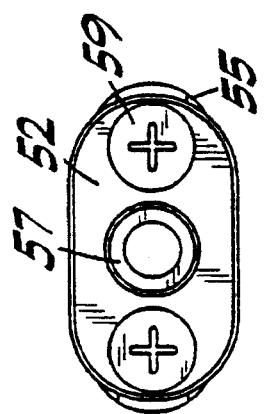
FIGS. 4A and 4B are top plan and side elevational views of the attachment plate, anchor nut, and attachment feet of the invention.
Figure 4B:
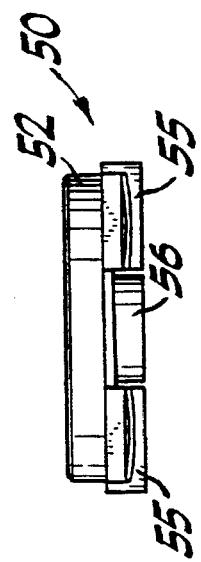
Figure 3:
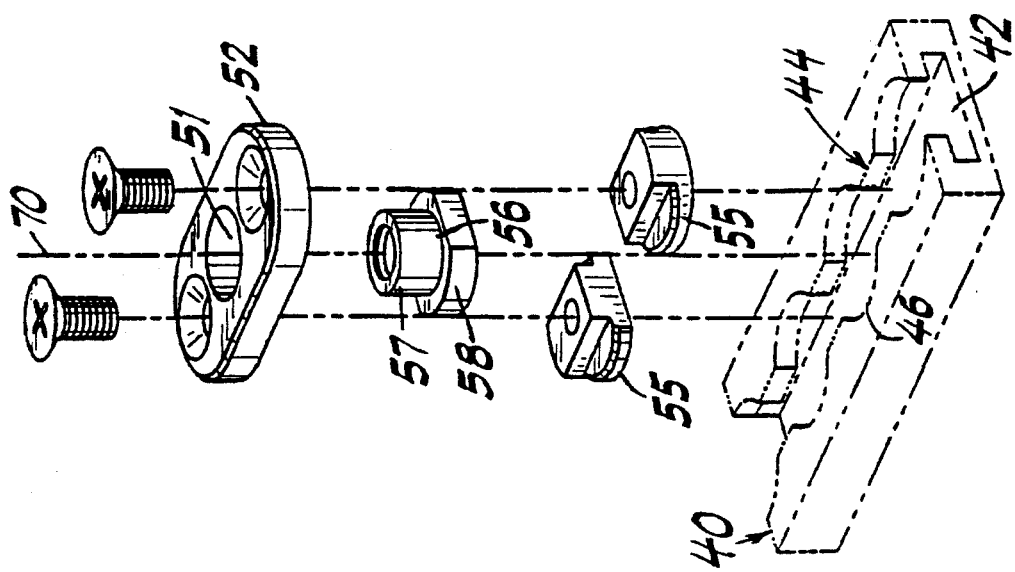
FIG. 3 is an exploded view further illustrating the fitting of FIG. 2.

In the embodiment of the invention illustrated in FIGS. 2–4, the invention comprises a generally oval attachment plate 52 having three holes, a center hole 51 to somewhat loosely accommodate the annular portion 57 of an anchor 56, and a set of holes laterally offset from the center hole 51 to accommodate screws 59. The screws 59 are used to provide a tightenable connection between the attachment plate and a pair of attachment feet 54.

The attachment feet 54 include a narrow, flat-topped portion 53 that lies atop a wider, generally circular skirt 55. The diameter of the skirt portion 55 is small enough to freely pass through the circular zones 46 of the track into the track slot 42, but not small enough to freely pass between the gap defined between facing track tabs 44. Hence, the attachment feet can be passed from above through the circular zones 46 to the slot 42, in which it can be freely slid.

Also lying beneath the attachment plate 52 is an anchor 56. The anchor consists of an internally threaded annular portion 57 sitting atop an anchor base 58 that has a circular periphery that is generally equal in diameter to the skirts 55 of the attachment feet. The outer diameter of the annular portion 57 of the anchor is sufficiently smaller than the diameter of the central hole 51 in the attachment plate 52 to permit some floating between the two.

In use, the screws 59 are first removed, and the anchor feet are passed through the circular zones 46 of the track 40. The base 58 of the anchor 56 is similarly passed to the slot. The attachment plate 52 is then sited at the appropriate place along the track, and the screws 59 are installed and tightened. At this point, the station line 70 at which the bulkhead is to be attached is centered over the approximate center of the anchor (as noted, there is some play between the anchor and the plate, so that this siting need not be exact).

The bulkhead is provided with an attachment box open at at least one side to provide free access to a hole that is aligned with the center hole 51 of the fitting 50. The bulkhead 20 can be slid into place over the chosen site.

As is best seen in FIG. 2, the bulkhead 20 is fixed in place by a hardened threaded anchor bolt 62, which is slipped into place from the opening in the attachment box 80 and threaded into place into the anchor 56.

It will be appreciated that because the anchor bolt can be slipped into place from above after the bulkhead is sited, the bulkhead (or related partition) need not be raised to accommodate the fitting hardware. This saves space which is usually at a premium in airplane cabins.

What is claimed is:

1. A fitting for an aircraft bulkhead, comprising:

an attachment plate having at least one through-hole;

a generally cylindrical, internally threaded anchor, said anchor being fittable within the through-hole of the attachment plate;

first and second attachment feet, said attachment feet being attachable to the attachment plate; and a threaded anchor bolt that can be threadably attached to said anchor so as to connect the anchor to the attachment plate.

2. The fitting of claim 1, wherein the attachment feet each include a first, flat pedestal portion, and a second rounded skin portion.

3. The fitting of claim 1, wherein the anchor is comprised of a central, internally threaded annular portion and a dependant base portion that has an at least partially circular skirt.

4. A fitting for an aircraft bulkhead, comprising:

an attachment plate having a first through-hole and a pair of laterally spaced holes;

a generally cylindrical, internally threaded anchor, said anchor being fittable within the through-hole of the attachment plate;

first and second attachment feet each of said attachment feet including a first, pedestal portion, and a second rounded skirt portion, said attachment feet being attachable to the attachment plate, wherein the pair of laterally spaced holes are configured to accommodate a set of screws through which the attachment feet are attached to the attachment plate; and a threaded anchor bolt that can be threadably attached to said anchor so as to connect the anchor to the attachment plate.

5. A fitting for an aircraft bulkhead, comprising:

an attachment plate having at least one through-hole;

a generally cylindrical, internally threaded anchor, said anchor being fittable within the through-hole of the attachment plate;

a track, said track having a central slot over which lies a series of inwardly projecting tab portions that separate a series of circular zones, the central slot being configured to receive a portion of the anchor;

first and second attachment feet, said attachment feet being attachable to the attachment plate and being configured to be received within the slot of the track; and a threaded anchor bolt that can be threadably attached to said anchor.

6. The fitting of claim 5, wherein the attachment feet include a first, flat pedestal portion, and a second rounded skirt portion.

7. The fitting of claim 5, wherein the anchor is comprised of a central, internally threaded annular portion and a dependant base portion that has an at least partially circular skirt.

8. The fitting of claim 6, wherein the attachment plate further includes a pair of laterally spaced holes configured to accommodate a set of screws through which the attachment feet are attached to the attachment plate.

9. The fitting of claim 6, wherein the attachment feet are configured to be passable to the slot of the track through only selected upper portions of the track.

* * * * *